(12) United States Patent
Rusanov et al.

(10) Patent No.: US 11,073,480 B2
(45) Date of Patent: Jul. 27, 2021

(54) OPTICAL SOOT PARTICLE SENSOR FOR MOTOR VEHICLES

(71) Applicant: Robert Bosch GmbH, Stuttgart (DE)

(72) Inventors: Radoslav Rusanov, Stuttgart (DE); Christoph Daniel Kraemmer, Karlsruhe (DE); Oliver Krayl, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 18 days.

(21) Appl. No.: 16/607,807

(22) PCT Filed: Apr. 19, 2018

(86) PCT No.: PCT/EP2018/060087
§ 371 (c)(1),
(2) Date: Oct. 24, 2019

(87) PCT Pub. No.: WO2018/202433
PCT Pub. Date: Nov. 8, 2018

(65) Prior Publication Data
US 2020/0056998 A1    Feb. 20, 2020

(30) Foreign Application Priority Data
May 3, 2017    (DE) .................... 102017207402.7

(51) Int. Cl.
*G01J 3/30* (2006.01)
*G01N 21/71* (2006.01)
*F01N 11/00* (2006.01)

(52) U.S. Cl.
CPC ......... *G01N 21/718* (2013.01); *F01N 11/002* (2013.01); *F01N 2900/1606* (2013.01)

(58) Field of Classification Search
CPC ............... G01N 21/718; G01N 21/645; G01N 21/6458; G01J 3/4406; G01J 3/02
(Continued)

(56) References Cited

U.S. PATENT DOCUMENTS

2004/0237505 A1    12/2004 Leipertz
2006/0165144 A1*    7/2006 Mikhailov ............ H01S 5/4062
                                            372/50.12
(Continued)

FOREIGN PATENT DOCUMENTS

CN    104865227 A    8/2015
DE    102008041038 A1    2/2010
(Continued)

OTHER PUBLICATIONS

International Search Report for PCT/EP2018/060087, dated Sep. 4, 2018.
(Continued)

*Primary Examiner* — Md M Rahman
(74) *Attorney, Agent, or Firm* — Norton Rose Fulbright US LLP; Gerard Messina

(57) ABSTRACT

A soot particle sensor includes a laser module including a laser and a detector configured for the detection of temperature radiation. The soot particle sensor provides that the laser is configured to generate laser light, and the soot particle sensor includes an optical element situated in the beam path of the laser of the laser module, which is configured to bundle laser light originating from the laser module in a spot, and the detector is situated in the soot particle sensor so that it detects the radiation originating from the spot.

18 Claims, 14 Drawing Sheets

(58) Field of Classification Search
USPC .......................................................... 356/318
See application file for complete search history.

(56) References Cited

U.S. PATENT DOCUMENTS

| | | | |
|---|---|---|---|
| 2007/0097366 A1* | 5/2007 | LeBoeuf | G01N 21/6486 |
| | | | 356/338 |
| 2010/0192678 A1 | 8/2010 | Vainshtein et al. | |
| 2014/0230523 A1 | 8/2014 | Stengel et al. | |
| 2016/0347236 A1* | 12/2016 | Yatsuda | F21K 9/64 |
| 2017/0307499 A1* | 10/2017 | Tiefenbach | G01N 15/0656 |
| 2017/0333001 A1* | 11/2017 | Sakaguchi | A61M 39/10 |
| 2018/0113200 A1* | 4/2018 | Steinberg | G02B 26/10 |

FOREIGN PATENT DOCUMENTS

| | | |
|---|---|---|
| DE | 102011017772 A1 | 10/2012 |
| DE | 102013202423 A1 | 8/2014 |
| EP | 0289200 A2 | 11/1988 |
| GB | 2459452 A | 10/2009 |
| JP | H09189657 A | 7/1997 |
| JP | 2001015637 A | 1/2001 |
| JP | 2005156221 A | 6/2005 |
| JP | 2011196832 A | 10/2011 |
| WO | 02095376 A2 | 11/2002 |
| WO | 2013013862 A1 | 1/2013 |

OTHER PUBLICATIONS

Bengston P-E et al., "Soot-Visualization Strategies Using Laser Techniques. Laser-Induced Fluorescence in C2 From Laser-Vaporized Soot and Laser-Unduced Soot Incandescence", Applied Physics B: Lasers and Optics, Springer International, Berlin, DE, vol. B60, No. 1, 1995, pp. 51-59, XP000489186.

Yuan Xiong et al., "AC Electric field induced vortex in laminar cofLow diffusion flames" Proceedings of the Combustion Institute, NL. vol. 35. No. 3, 2015, pp. 3513-3520, XP055502457.

* cited by examiner

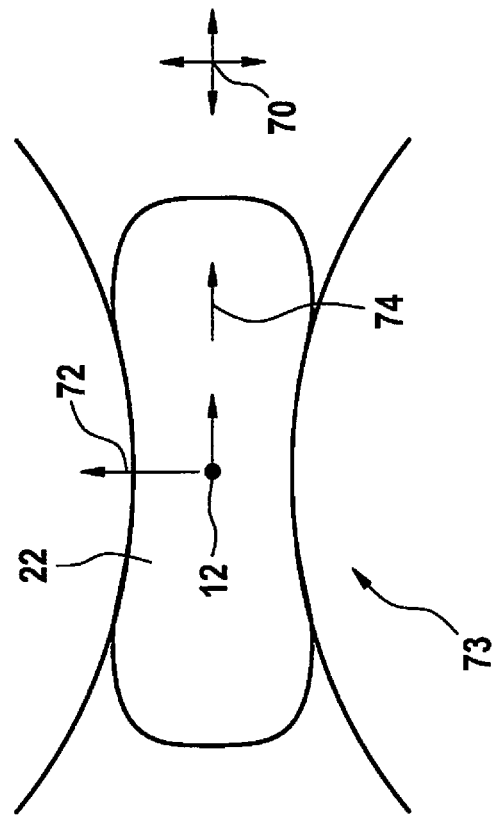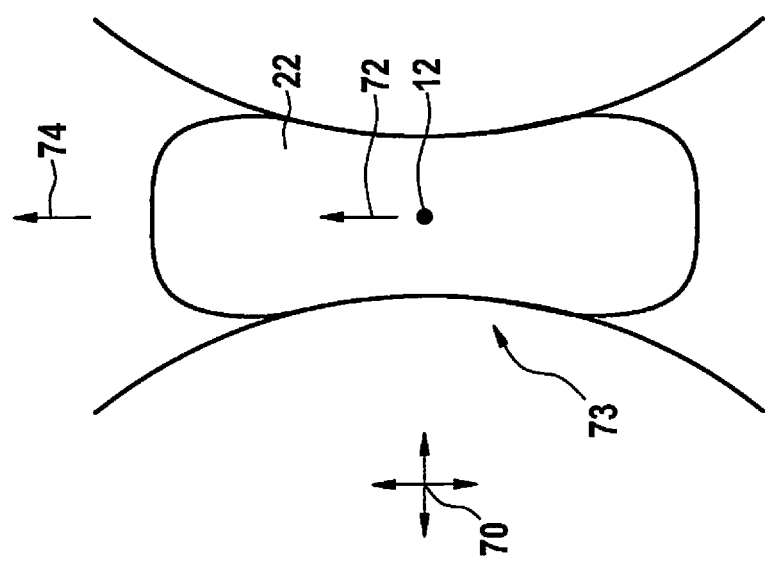
FIG. 11

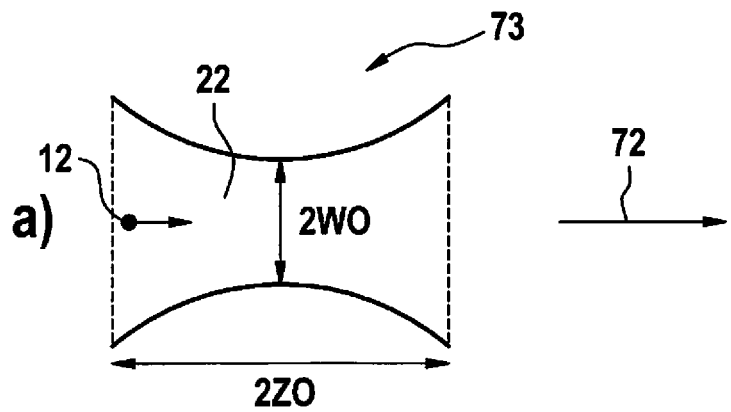
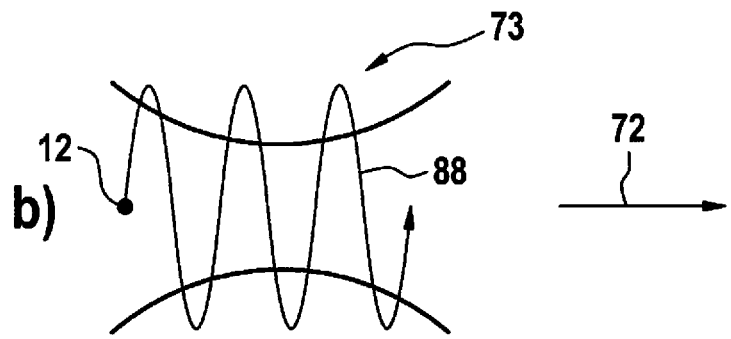
FIG. 14
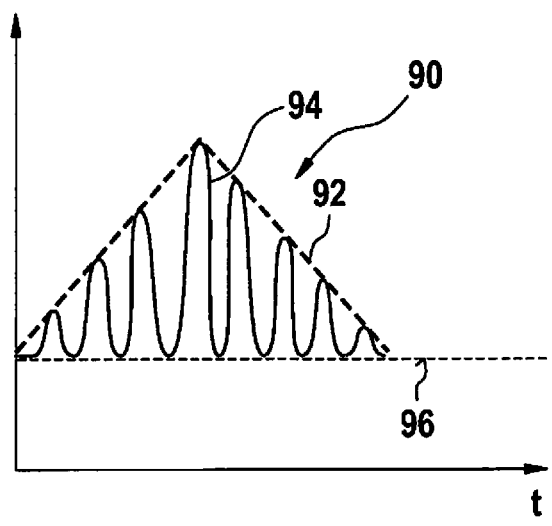
FIG. 15

OPTICAL SOOT PARTICLE SENSOR FOR MOTOR VEHICLES

FIELD OF THE INVENTION

The present invention relates to a soot particle sensor. Such a soot particle sensor includes a laser module having a laser and a detector configured for detecting temperature radiation.

BACKGROUND INFORMATION

Motor vehicles driven using modern diesel engines are equipped with diesel particle filters. The functionality of these particle filters has to be monitored using an onboard diagnostic apparatus/arrangement in accordance with legal regulations. For motor vehicles, for example, sensors including an electrical resistor, which are manufactured and sold by the applicant, are used. The operating principle of these known sensors is based on the formation of conductive soot paths between two interdigital electrodes. In the sensors, the rise time of the current after application of a voltage is a measure of the soot concentration. The mass concentration ($mg/m^3$ exhaust gas or mg/km driving distance) is measured. The computation of the numeric concentration (number of particles per $m^3$ exhaust gas or per km driving distance) is only possible with great difficulty or is even impossible in the case of this sensor concept for manifold reasons. The known sensor is periodically regenerated in that it is heated by an integrated heating element to at least 700° C., whereby the soot deposits burn off.

In the scientific scene which is concerned with the influence of fine particles on health, there have been discussions for some time about which of the dimensions particle total mass (specified in $mg/m^3$ or in mg/km) or number n of the particles ($n/m^3$ or n/km) is the more critical dimension with respect to impairments of health. It is to be noted that in particular the small soot particles, which only have a small proportion of the total mass due to their very small mass ($m \sim r^3$), are particularly hazardous. This is because of their high "penetration depth" into the human body, which results from their small size. It is therefore foreseeable that the legislation will also prescribe onboard diagnostic apparatu/arrangement for the metrological detection of the particle number, as soon as corresponding approaches (acceptable with respect to performance and price) are available on the market.

The principle of laser-induced incandescence (LII) is believed to have been understood for some time for detecting nanoparticles (in air) and is also intensively applied, for example, for the characterization of the combustion process in "glass" engines in the laboratory or for the exhaust gas characterization in laboratory environments. The soot particles are heated using a nanosecond pulse of a high-power laser to several thousand degrees Celsius, so that they emit significant temperature radiation. This thermally induced light emission of the soot particles is measured using a light detector. The method permits the detection of very small soot particles having a diameter of down to a size of less than 10 nm. This laser-induced incandescence forms the definition of the species in claim 1.

SUMMARY OF THE INVENTION

The present invention differs from this related art operating using high-power nanosecond lasers in that the soot particle sensor includes an optical element arranged in the beam path of the laser of the laser module, which is configured to bundle laser light originating from the laser module in a spot, and the detector is situated in the soot particle sensor in such a way that it detects radiation originating from the spot. The radiation may be temperature radiation or radiation released by chemical reactions, such as an oxidation of the soot occurring in the spot.

The sensor according to the present invention is also suitable for use as an onboard diagnostic sensor in motor vehicles, in contrast to the known sensor. The soot particle sensor according to the present invention also uses the principle of laser-induced incandescence.

One embodiment provides that the laser module is configured to generate parallel laser light, and the optical element is configured to bundle parallel laser light originating from the laser module in the spot.

In one embodiment, the laser is a cost-effective CW laser, for example, a diode laser. High-priced, Q-switched solid-state lasers are used for LII experiments in the related art. The generally lower power of the CW laser is compensated for by strong focusing of the laser light.

The laser light of the CW laser is focused via the optical element (for example, a lens) on a very small spot. It is entirely possible that the laser is modulated, but a CW laser may be used. This enables the usage of cost-effective semiconductor laser elements (laser diodes), which reduces the price of the entire sensor unit and greatly simplifies the activation and evaluation. It may be ensured by the very small spot dimensions (for example, several μm) that at most one soot particle is always located in the spot, and the measured signal only originates from this one soot particle.

A single particle measurement is thus possible, which enables the extraction of pieces of information about the soot particles such as its size. This represents a clear advantage over other measuring methods for soot particle measurement. The present invention also advantageously permits a high measuring speed (at least 1 measurement per second in comparison to multiple minutes per measurement) and offers the option of a measurement of the particle count. The present invention thus permits both the determination of the mass concentration ($mg/m^3$ or mg/km) and the numeric concentration (soot particles/$m^3$ or soot particles/km) of the emitted soot particles.

The use in motor vehicles driven using gasoline engines for monitoring a gasoline particle filter used therein and for detecting the soot particle emission of the gasoline engine is thus also possible. In particular in the case of gasoline engines operated using gasoline, it is important to be measurable rapidly after the start of the vehicle, since a majority of the soot particles arise there during the cold start. For gasoline engines, the soot particle number measuring capacity is additionally also particularly important because of the fineness, i.e., the small size of the soot particles (little mass, high number). Since automotive sensors (onboard) presently available on the market are not capable of reliably measuring soot particle counts, this soot particle number measuring capacity of the soot particle sensor according to the present invention is particularly important and advantageous.

Beyond a use in gasoline engines operated using gasoline, the soot particle sensor according to the present invention may be used in any combustion process. Areas of application may include the detection of soot particle masses and numeric concentrations in the onboard monitoring of the diesel particle filter in passenger automobiles and trucks and also in the off-road field in construction machines, and as a sensor for measuring fine dust concentrations, for example, in the case of monitoring a room air quality or monitoring the emissions of private or industrial incinerators, etc. The soot particle sensor according to the present invention is based on the principle of laser-induced incandescence.

One embodiment provides that the laser is a semiconductor laser element, in particular a laser diode.

It may also be provided that the detector include at least one photodiode. The photodiode may be a photodiode sensitive to near infrared and visible light.

Furthermore, it may be provided that the soot particle sensor include a beam splitter, which is situated in the beam path of the parallel laser light in such a way that it orients at least a part of the laser light incident from the laser module on the optical element and orients temperature radiation incident from the spot at least partially on the detector.

A further embodiment is distinguished in that the beam splitter is a polarizing beam splitter, and the beam splitter is aligned in such a way that it is maximally permeable for the incident laser light having a predetermined polarization direction.

It may also be provided that the soot particle sensor include an optical filter, which is situated in the beam path between the beam splitter and the detector and is less transmissible to the laser light than to the LII light originating from the spot.

Furthermore, it may be provided that the laser be configured to emit laser light at wavelengths below 500 nm, in particular at a wavelength of 405 nm, 450 nm, or 465 nm, and that the optical filter be of such a nature that it attenuates or even blocks light having wavelengths below 500 nm. A bandpass filter may also be used, which only does not let pass a range around the laser wavelength.

Another embodiment is distinguished in that the soot particle sensor includes a first part, which is configured to be subjected to a measuring gas, and includes a second part, which is not to be subjected to the measuring gas, and which contains the optical components of the soot particle sensor, the two parts being separated by a partition wall nonpermeable to the measuring gas.

It also may be provided that a window, which is permeable both to the laser light and to LII light originating from the spot, be installed in the partition wall in the beam path of the laser light.

Furthermore, it may be provided that the soot particle sensor include an arrangement of an outer protective tube and an inner protective tube, which both have a cylindrical shape, and that the protective tubes be situated coaxially, the axes of the cylindrical shapes may be aligned parallel to the incidence direction of the laser light and the spot being located in the interior of the inner protective tube, that the outer protective tube protrude beyond the inner protective tube at its end facing toward the laser, and that the inner protective tube protrude beyond the outer protective tube at the opposite end.

A further embodiment is distinguished in that the soot sensor includes a shaker module, which includes an oscillating movable element, which is mechanically rigidly connected to the laser module, so that an oscillation of the movable part of the shaker module is transmitted to the laser module.

It also may be provided that the shaker module include a piezoelectric actuator which includes the movable element or an electromagnetic actuator which includes the movable element or an actuator operating using magnetostriction which includes the movable element.

Furthermore, it may also be provided that the soot particle sensor include at least one pair of electrodes, which are situated in the soot particle sensor on different sides of the spot.

It may also be provided that the soot particle sensor include a pair of soundwave exciters, which are situated in the interior of the inner protective tube.

Furthermore, it may also be provided that the soundwave exciters be transducers. The transducers may operate on the basis of piezoelectricity or magnetostriction or are electrically or electromagnetically actuated and generate a standing ultrasound wave.

Further advantages result from the further descriptions herein, the description, and the appended figures.

It is obvious that the above-mentioned features and the features to be explained hereafter are usable not only in the particular specified combination, but rather also in other combinations or alone, without departing from the scope of the present invention.

Exemplary embodiments of the present invention are shown in the drawings and are explained in greater detail in the following description. Identical reference numerals in various figures each identify elements which are identical or at least comparable in their function.

BRIEF DESCRIPTION OF THE DRAWINGS

FIG. 11 schematically shows a spot in a beam waist of the laser light for various combinations of the flow direction of the gas carrying the soot particles and the propagation direction of the laser light in a soot particle sensor according to the present invention.

FIG. 14 schematically shows the beam waist of laser light defining a spot together with a soot particle.

FIG. 15 schematically shows a LII signal of a soot particle, which moves on a spatially oscillating trajectory through a laser spot.

DETAILED DESCRIPTION

Figure 1:
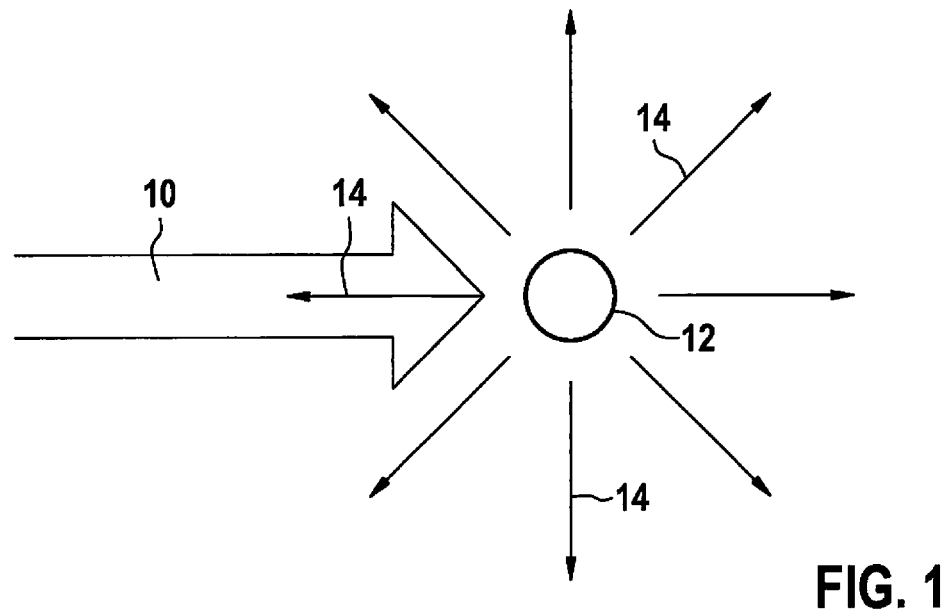
FIG. 1 schematically shows a measuring principle based on laser-induced incandescence, which is used in the present invention.

FIG. 1 illustrates the measuring principle based on laser-induced incandescence (LII). Laser light 10 of high intensity is incident on a soot particle 12. The intensity of laser light 10 is sufficiently high that the energy of laser light 10 absorbed by soot particle 12 heats soot particle 12 to several thousand degrees Celsius. As a consequence of the heating, soot particle 12 emits significant radiation 14, spontaneously and essentially without a preferred direction, in the form of temperature radiation, also referred to hereafter as LII light. A part of radiation 14 emitted in the form of temperature radiation is therefore also emitted opposite to the direction of incident laser light 10.

Figure 2:
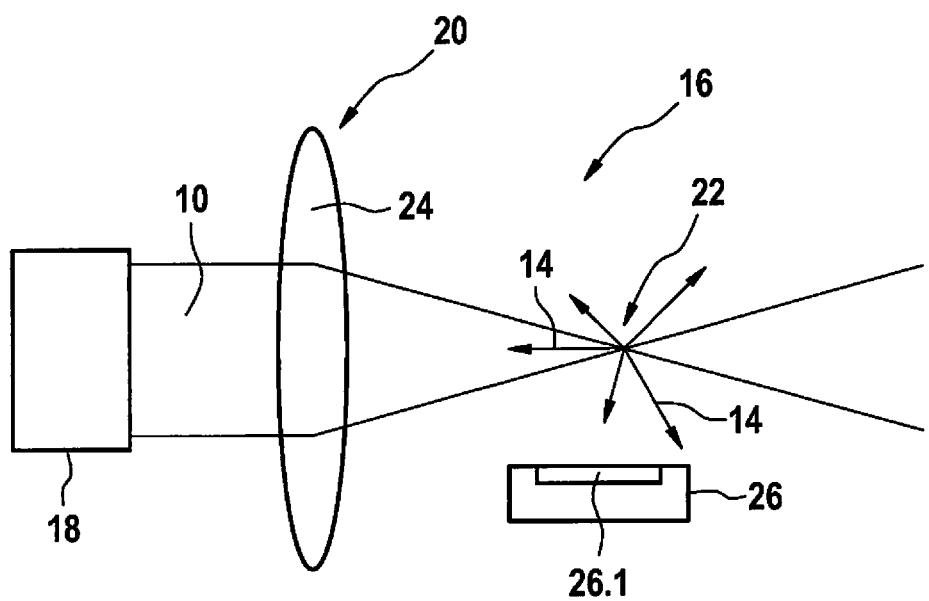
FIG. 2 schematically shows a basic structure of a soot particle sensor according to the present invention.

FIG. 2 schematically shows a basic structure of an exemplary embodiment of a soot particle sensor 16 according to the present invention. Soot particle sensor 16 includes a CW laser module 18 (CW: continuous wave) here, whose parallel laser light 10 is focused using at least one optical element 20 situated in the beam path of CW laser module 18 on a very small spot 22. Optical element 20 may be a first lens 24. The intensity of laser light 10 only reaches the high values required for LII in the volume of spot 22. The present invention is not restricted to the use of a CW laser. Using lasers operated in a pulsed manner is also conceivable.

The dimensions of spot 22 are in the range of several μm, in particular in the range of at most 200 μm, so that soot particles 12 traversing spot 22 are excited to emit radiant powers, whether by laser-induced incandescence or by chemical reactions (in particular oxidation), which may be evaluated. As a result thereof, it may be presumed that always at most one soot particle 12 is located in spot 22, and an instantaneous measuring signal of soot particle sensor 16 only originates from this at most one soot particle 12. The measuring signal is generated by a detector 26, which is situated in soot particle sensor 16 in such a way that it detects radiation 14, in particular temperature radiation, originating from soot particle 12 flying through spot 22. Detector 26 may include at least one photodiode 26.1 for this purpose. A single particle measurement thus becomes possible, which enables the extraction of pieces of information about soot particle 12, such as size and speed.

The exhaust gas speed may thus be determined, and the computation of a particle size spectrum becomes possible. The first variable is important for the computation of the numeric concentration of soot particles 12. In combination with the second variable, the mass concentration may also be computed. This represents a clear advantage over other measuring methods for soot particle measurement.

It is entirely possible that the laser of laser module 18 is modulated or switched on and off (duty cycle<100%). However, the laser of laser module 18 may remain a CW laser. This enables the use of cost-effective semiconductor laser elements (laser diodes), which reduces the price of the complete soot particle sensor and greatly simplifies the activation of laser module 18 and the evaluation of the measuring signal. The use of pulsed lasers is not precluded, however.

Figure 3:
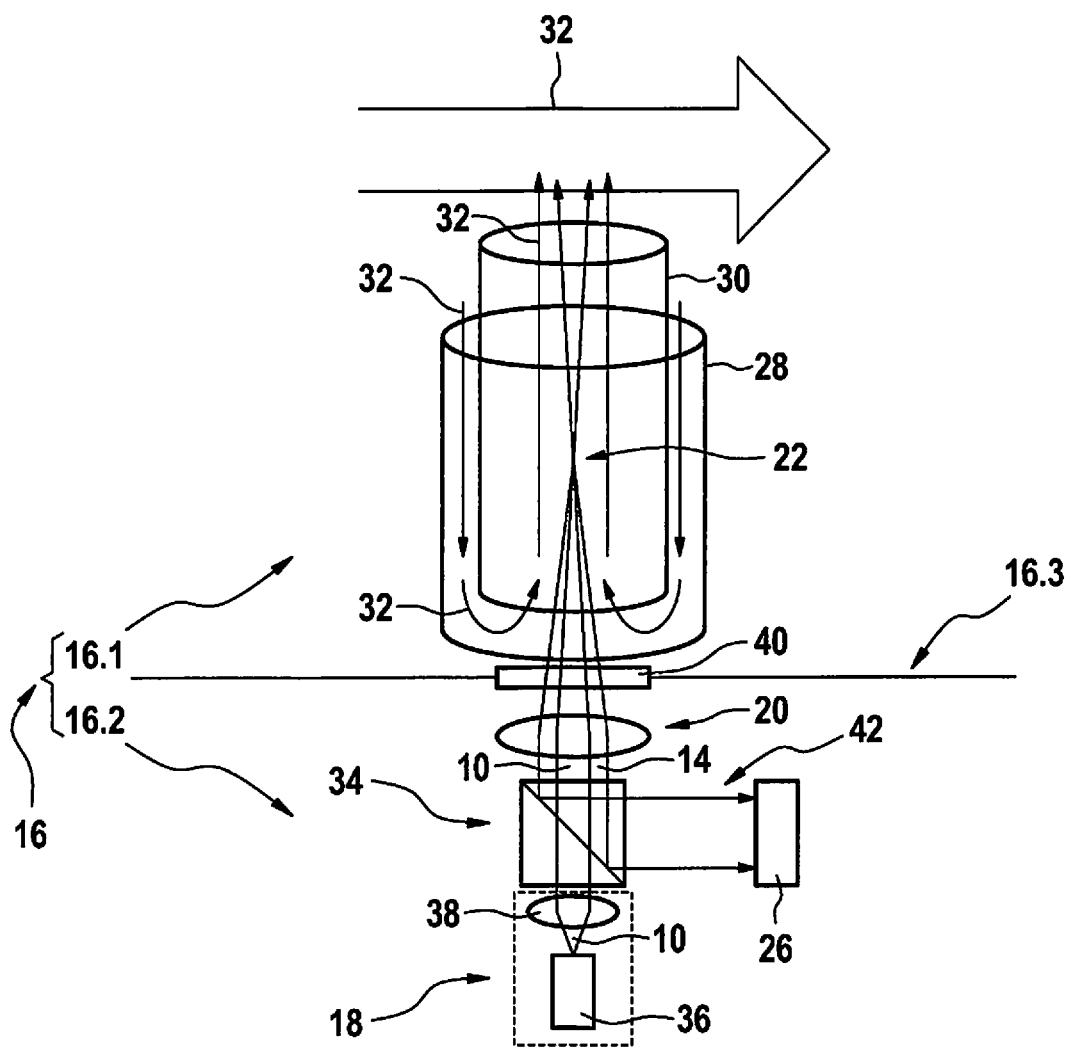
FIG. 3 schematically shows a first exemplary embodiment of a soot particle sensor according to the present invention.

FIG. 3 shows an advantageous exemplary embodiment of a soot particle sensor 16 according to the present invention, which is suitable for use as a soot particle sensor in the exhaust gas of a combustion process.

Soot particle sensor 16 includes an arrangement made of an outer protective tube 28 and an inner protective tube 30. The two protective tubes 28, 30 may have a generally cylindrical shape or prismatic shape. The footprints of the cylindrical shapes may be circular, elliptical, or polygonal. The cylinders may be situated coaxially, the axes of the cylinders being aligned transversely in relation to the flow of exhaust gas 32. Inner protective tube 30 protrudes in the direction of the axes into flowing exhaust gas 32 beyond outer protective tube 28. At the end of the two protective tubes 28, 30 facing away from the flowing exhaust gas, outer protective tube 28 protrudes beyond inner protective tube 30. The clear width of outer protective tube 28 may be sufficiently larger than the external diameter of inner protective tube 30 that a first flow cross section results between the two protective tubes 28, 30. The clear width of inner protective tube 30 forms a second flow cross section.

This geometry has the consequence that exhaust gas 32 enters via the first flow cross section into the arrangement of the two protective tubes 28, 30, then changes its direction at the end of protective tubes 28, 30 facing away from exhaust gas 32, enters inner protective tube 30, and is suctioned out of it by exhaust gas 32 flowing past. A laminar flow results in inner protective tube 30. This arrangement of protective tubes 28, 30, having soot particle sensor 16 transverse in relation to the exhaust gas flow, is fastened on or in an exhaust gas pipe.

Soot particle sensor 16 additionally includes laser module 18, which generates parallel laser light 10. A beam splitter 34 is located in the beam path of parallel laser light 10. A part of laser light 10 passing through beam splitter 34 without deflection is focused by optical element 20 to form a very small spot 22 in the interior of inner protective tube 30. The light intensity is sufficiently high in this spot 22 to heat soot particles 12 transported with exhaust gas 32 to several thousand degrees Celsius, so that heated soot particles 12 emit significant radiation 14 in the form of temperature radiation. Radiation 14 is, for example, in the near infrared and visible spectral range, without the present invention being restricted to radiation 14 from this spectral range. A part of this radiation 14, which is emitted in an undirected manner in the form of temperature radiation, or this LII light is detected by optical element 20 and oriented via beam splitter 34 on detector 26. This structure has the particularly important advantage that only one optical access to exhaust gas 32 is required, since the same optical unit, in particular the same optical element 20, is used for generating spot 22 and for detecting radiation 14 originating from soot particle 12. Exhaust gas 32 is an example of a measuring gas. The measuring gas may also be another gas or gas mixture, for example, room air.

In the subject matter of FIG. 3, laser module 18 includes a laser diode 36 and a second lens 38, which may align laser light 10 originating from laser diode 36 in parallel. The use of laser diode 36 represents a particularly cost-effective and easily handled option for generating laser light 10. Parallel laser light 10 may be focused by optical element 20 to form spot 22.

Optical soot particle sensor 16 may include a first part 16.1 subjected to the exhaust gas and a second part 16.2, which is not subjected to the exhaust gas and contains the optical components of soot particle sensor 16. Both parts are separated by a partition wall 16.3, which extends between protective tubes 28, 30 and the optical elements of the soot particle sensor. Wall 16.3 is used for isolating the sensitive optical elements from hot, chemically aggressive, and "dirty" exhaust gas 32. A protective window 40 is installed in partition wall 32 in the beam path of laser light 10, through which laser light 10 is incident in exhaust gas 32 and via which radiation 14 originating from spot 22 may be incident on optical element 20 and from there via a beam splitter 34 on detector 26.

Alternatively to the exemplary embodiment shown here, the generation of spot 22 and the detection of radiation 14 originating from soot particles in the spot may also take place via separate optical beam paths.

It is also conceivable to generate spot 22 using lens combinations other than those which are indicated here solely as an exemplary embodiment. Moreover, soot particle sensor 16 may also be implemented using laser light sources other than laser diode 36 indicated here for exemplary embodiments.

Figure 4:
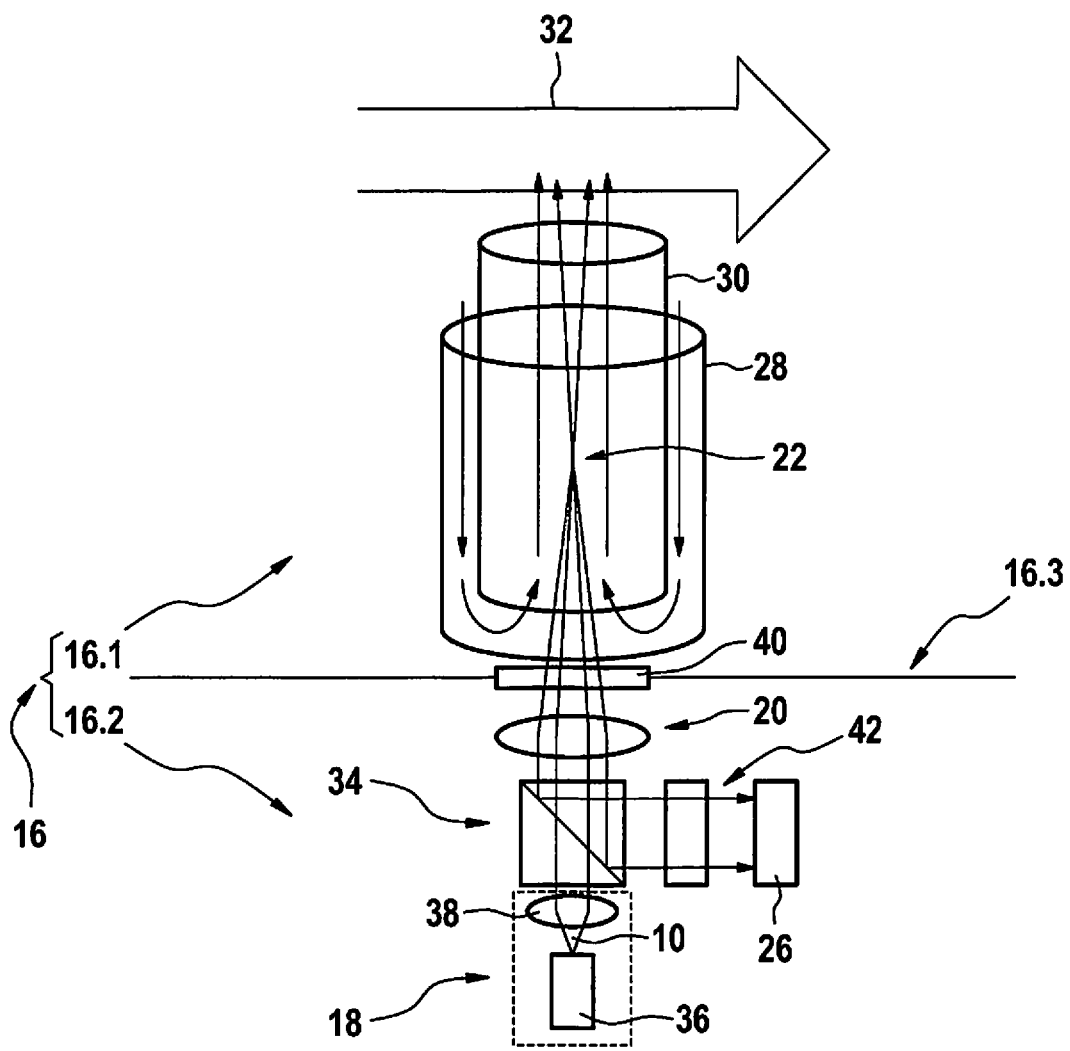
FIG. 4 schematically shows a second exemplary embodiment of a soot particle sensor according to the present invention based on the subject matter of FIG. 3.

FIG. 4 shows another exemplary embodiment based on the subject matter of FIG. 3. Soot particle sensor 16 of FIG. 4 differs from soot particle sensor 16 of FIG. 3 by way of an additional filter 42, which is situated in the beam path between beam splitter 34 and detector 26. Filter 42 is distinguished in that it is less permeable to laser light 10 than to radiation 14, which originates from spot 22 if a soot particle 12 is located therein.

This exemplary embodiment significantly improves the signal-to-noise ratio of the light incident on detector 26 because it greatly reduces the quantity of laser light 10 which would be incident on detector 26 due to back reflections of laser light 10 on the optical components of soot particle sensor 16. Such laser light would generate interfering background detector signals, which would complicate a detection of radiation 14 originating, for example, in the form of temperature radiation from soot particles in spot 22. The interfering background noise for the pulses of radiation 14 emitted by soot particles 12, for example, in the form of temperature radiation is reduced by filter 42. The exemplary embodiment including filter 42 specifically utilizes the narrow bandwidth of laser sources (for example, laser diodes), in that precisely this narrow bandwidth is filtered out before light detector 26. The use of a simple edge filter is also conceivable. The signal-to-noise ratio is thus very strongly improved.

If soot particle sensor 16 is installed in an exhaust system of a combustion process, the filtering of the excitation light (laser light) carried out using filter 42 in conjunction with the almost complete absence of external/ambient light in the exhaust system permits the use of particularly sensitive detectors 26, for example, cost-effective SiPM (silicon photomultiplier) or SPAD diodes (single-photon avalanche diode). As a result, even a light signal generated by a particularly small soot particle, which is therefore extremely small, and which is formed, for example, by a few tens of photons, may be detected. The dimensions of soot particles which are still just detectable thus drop to a lower detection limit of 10 to 100 nm.

Figure 5:
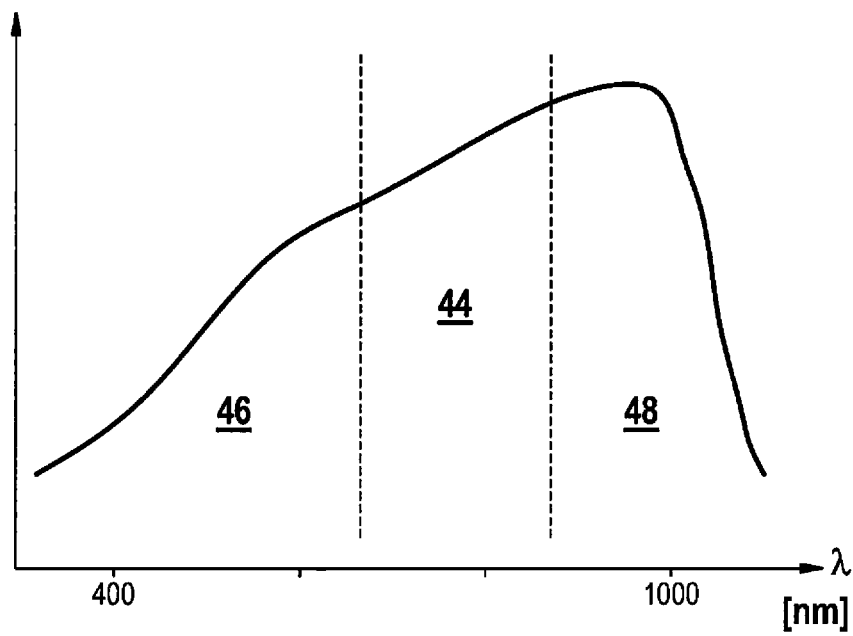
FIG. 5 schematically shows a sensitivity of a silicon photodiode usable as a detector of a soot particle filter as a function of wavelength A of the incident light having first wavelength ranges.

FIG. 5 shows by way of example the sensitivity of a silicon photodiode usable as a detector 26 as a function of wavelength A of the incident light in arbitrary units. The sensitivity is significant in the range between approximately 300 nm and 1100 nm. This is transferable to other silicon-based detectors 26. FIG. 5 also shows a schematic view of a possible wavelength range 44 of laser light 10 of exciting laser module 18. Light at these wavelengths is filtered out of the beam path by optical filter 42 before it reaches detector 26. The detection of radiation 14, which is emitted, for example, in the form of temperature radiation and originates from soot particles 12 excited in spot 22, takes place in remaining wavelength ranges 46, 48, in which detector 26, which is based on silicon, is still sensitive.

Figure 6:
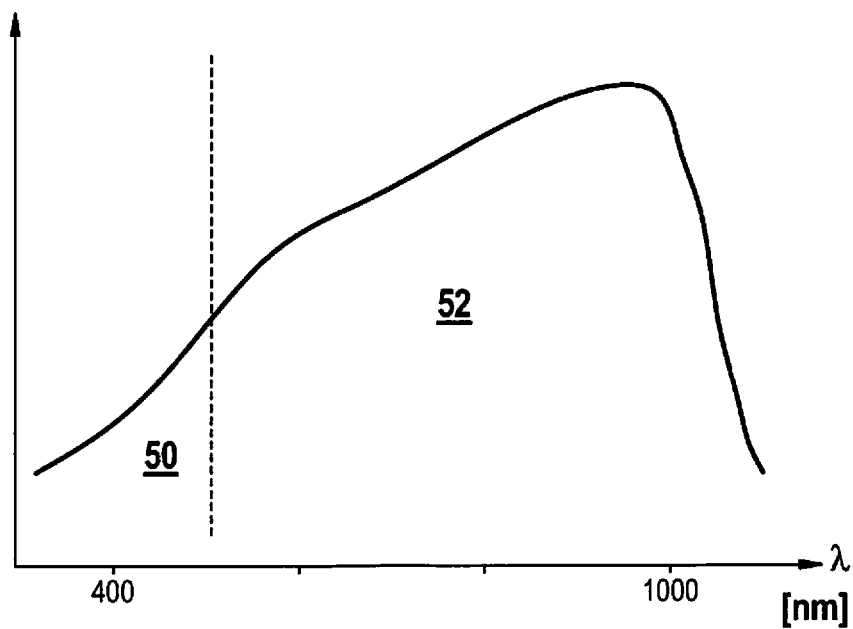
FIG. 6 also schematically shows the sensitivity of a silicon photodiode usable as a detector as a function of wavelength A of the incident light having second wavelength ranges.

FIG. 6 initially also shows the sensitivity of a silicon photodiode usable as detector 26 as a function of wavelength A of the incident light in arbitrary units. The sensitivity range is divided here into a first range 50 of comparatively shorter wavelengths and a second range 52 of comparatively longer wavelengths. The wavelengths of exciting laser light 10 of laser module 18 may be in first range 50, for example, at wavelengths below 500 nm (for example, 405, 450, 465 nm). Optical filter 42 may be a filter which strongly attenuates or even substantially blocks light at wavelengths below, for example, 500 nm.

A significant advantage of this variant is that almost the entire wavelength range in which a silicon-based detector is sensitive may be used for the detection. A further advantage is that this variant enables a use of step filters, which block light having wavelengths below a lower limiting wavelength and let pass light having wavelengths above a limiting wavelength. Such step filters are typically more cost-effective than bandwidth filters, which block light having wavelengths which are in a narrow wavelength range containing the wavelength of the laser light.

As already mentioned, laser diodes may be used as the laser light sources. In addition to the above-mentioned advantages, laser diodes have the advantage that their emission of laser light may be modulated using MHz frequencies. This is utilized in the exemplary embodiment explained hereafter. The basic concept of this exemplary embodiment is a modulation with respect to time of the intensity of laser light 10 emitted by laser module 18. As a result, a variation in the intensity of radiation 14 originating from a soot particle 12, which is presently located in spot 22, in the form of temperature radiation because of LII results at equal frequency. A soot particle 12 flying through spot 22 thus heats up multiple times and cools down again in each case between successive heating events, so that a periodic LII signal results. Lock-in amplification methods may be applied to such a LII signal to improve signal-to-noise ratio SNR.

A significant advantage of this exemplary embodiment is that the frequency of LII signal is shifted to a high carrier frequency, namely to the frequency of the modulation of the intensity of the laser light, which is in the MHz range, whereby it reacts much less sensitively to external disturbances, for example, as may be triggered by vibrations occurring in driving operation of a motor vehicle. Vibrations occurring in driving operation have frequencies of only a few Hz.

A modulation of the laser power taking place using frequencies in the MHz range is generally not possible in the case of pumped ns high-power lasers, which are typically used for LII. If one goes still further in the direction of fs high-power lasers, these frequencies are reached again.

Soot particle sensor 16 used in this exemplary embodiment corresponds to the above-described exemplary embodiments. The modulation with respect to time of the intensity of the laser light originating from laser module 18 may be carried out in a sinusoidal manner so that the intensity of emitted laser light 10 corresponds to the maximum power of laser module 18 and the lowest intensity of emitted laser light 10 is achieved by the (short-term) switching off of laser module 18.

However, all possible other variations are also conceivable with respect to the signal form and span. Solely as an example, a square-wave profile or a sawtooth profile of the intensity over the time are mentioned in this regard. In the case of a modulation in which the intensity of laser light 10 changes at a frequency in the MHz range, the intensity in spot 22 will assume maximum and minimum values multiple times in the time span in which a soot particle 12 flying at typical exhaust gas speeds through spot 22 is located in spot 22, so that soot particle 12 is periodically heated and cooled. The LII signal of radiation 14 emitted by soot particle 12 in the form of temperature radiation thus oscillates at the same frequency and with constant phase with respect to the oscillation of the intensity of laser light 10. The frequency of such an oscillation has to be in the range of 100 kHz to 10 MHz, so that a soot particle 12 having a typical traversal time of 1 μs to 1 ms may be illuminated multiple times in spot 22. On the other hand, this oscillation may not be more rapid than the typical heating time and cooling time of soot particle 12 in spot 22. This time is between 100 ns and 10 μs.

Figure 7:
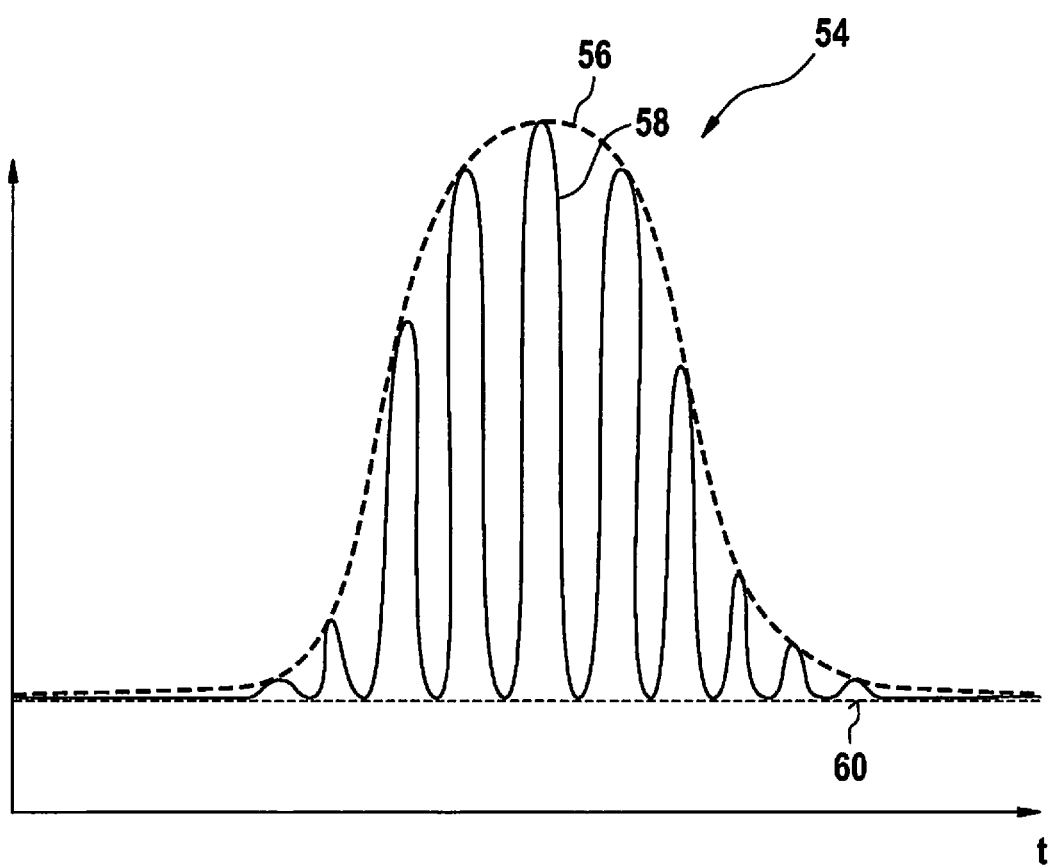
FIG. 7 schematically shows a qualitative representation of the LII signal of a soot particle in the case of a modulation of the intensity of the exciting laser light which takes place sufficiently rapidly with respect to time.

FIG. 7 shows a schematic and qualitative view of LII signal 54 of a soot particle 12 in arbitrary units over time t for the case that soot particle 12 flies through the region of spot 22 and, sufficiently rapidly with respect to time, a modulation of the intensity of exciting laser light 10 takes place. The modulation may take place at a modulation frequency which is in the range of 100 kHz to 100 MHz. LII signal 54 images the intensity of radiation 14 emitted in the form of temperature radiation by soot particle 12 after excitation by laser light 10. Hüll curve 56 corresponds to the LII signal for the case that the intensity of laser light 10 is not modulated. A modulation of exciting laser light 10 has the result that soot particle 12 is illuminated and heated again and again by exciting laser light 10, so that rapidly oscillating signal 58 results, in which the rapid oscillation of radiation 14 emitted in the form of temperature radiation by soot particle 12 is imaged. Lock-in amplification methods may be applied to such a signal 58 to improve the signal-to-noise ratio (SNR) and in particular to eliminate interfering signal background noise 60.

Figure 8:
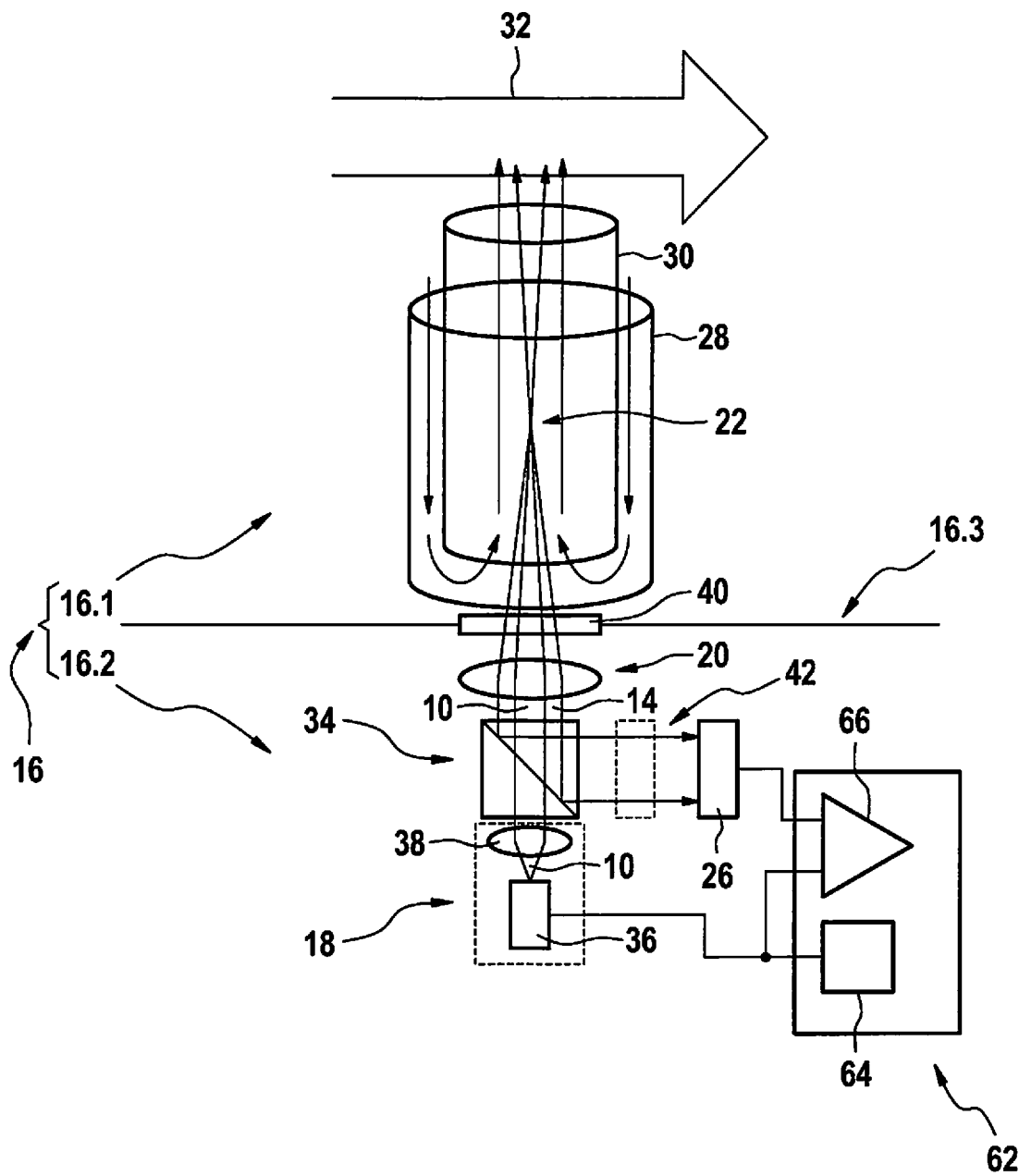
FIG. 8 schematically shows an exemplary embodiment of the soot particle sensor from FIG. 3 including connected control and evaluation electronics.

FIG. 8 shows an exemplary embodiment of a soot particle sensor 16 including connected control and evaluation electronics 62. Soot particle sensor 16 corresponds, for example, to soot particle sensor 16 explained with reference to FIG. 3, so that the description of FIG. 3 also applies to FIG. 8. Control and evaluation electronics 62 may be a separate control unit or they may be integrated into a control unit which is used to control the combustion process. Control and evaluation electronics 62 include a control module 64, which modulates the intensity of laser light 10 originating from laser module 18, as was explained, for example, with reference to FIG. 7. The signal of detector 26 is supplied to a lock-in amplifier 66, to which in addition a signal is supplied which images the modulation of the laser light. This signal may be taken directly from control module 64, as shown in FIG. 8, or it may be taken from laser module 18. As a result, the signal of detector 26 may be correlated with the modulation of exciting laser light 10 during the signal processing and signal amplification in control and evaluation electronics 62, which may be carried out, for example, by a person skilled in the art to improve the signal-to-noise ratio for available lock-in methods or pseudorandom sequences methods or general signal correlation methods.

Such a modulation of the laser power in the MHz range is generally not possible in the case of pumped ns high-power lasers, which are typically used for LII. However, if one goes further into the fs range, such repetition rates are again possible.

One advantageous embodiment of the subject matter of FIG. 8 is distinguished by a filter 42 which is situated as shown in FIG. 4 and which includes the further above-described properties. This embodiment filters out an influence of an oscillation of the intensity of laser light 10 backscattered by the optical components on measuring signal generated by detector 26.

Figure 9:
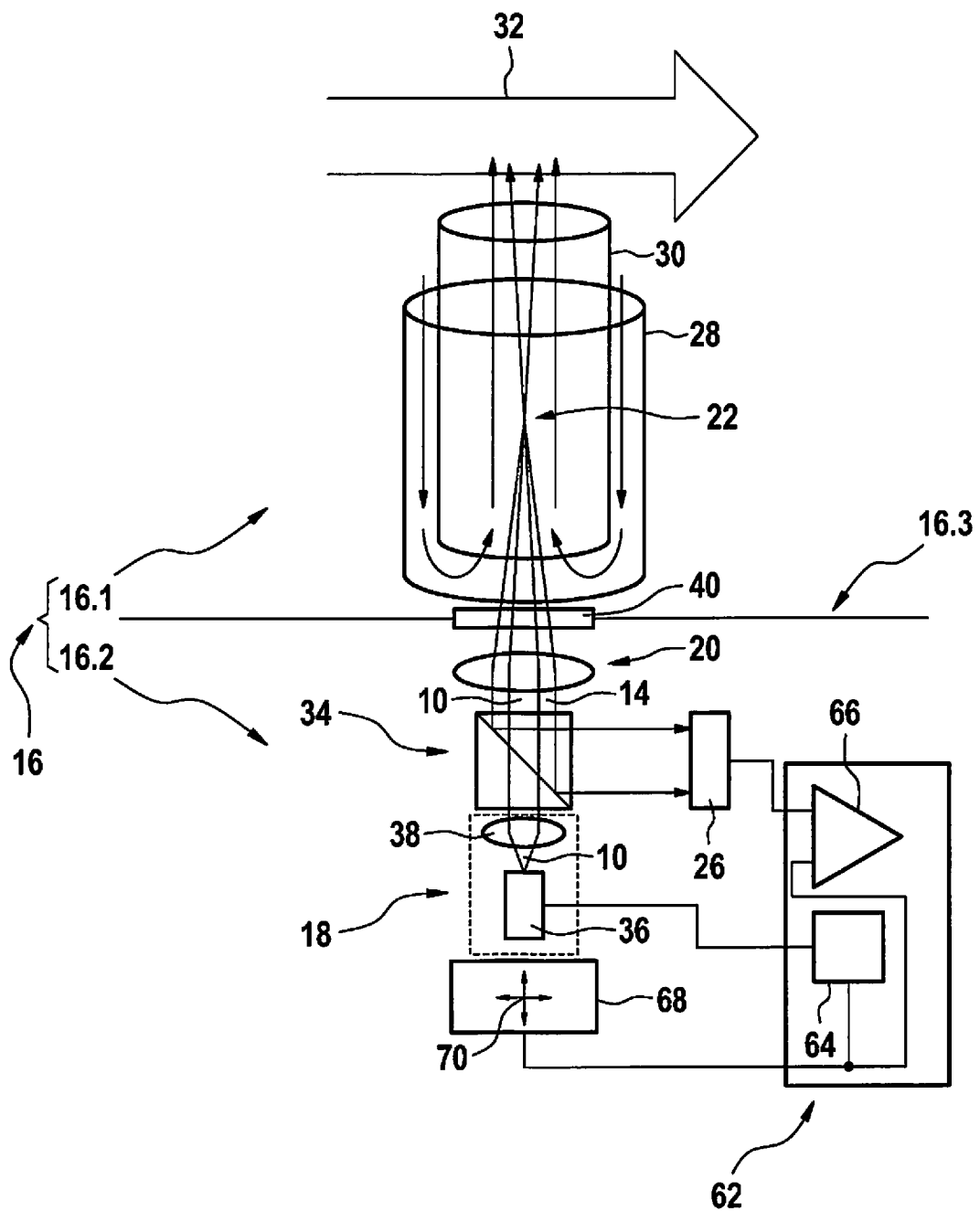
FIG. 9 schematically shows a third exemplary embodiment of a soot particle sensor including connected control and evaluation electronics.

FIG. 9 shows another exemplary embodiment of a soot particle sensor 16 including connected control and evaluation electronics 62. Soot particle sensor 16 includes a shaker module 68. In the exemplary embodiment shown, a movable element of shaker module 68 is mechanically rigidly connected to laser module 18, so that an oscillation of the movable part of shaker module 68 is transmitted to laser module 18. Otherwise, soot particle sensor 16 of FIG. 9 corresponds, for example, to soot particle sensor 16 explained with reference to FIG. 3, so that its description also applies to soot particle sensor 16 of FIG. 9. The other components of soot particle sensor 16 are not rigidly connected to the movable part of shaker module 68 and therefore do not carry out its oscillation movement. Control and evaluation electronics 62 correspond to control and evaluation electronics 62 of FIG. 8, so that its description also applies to control and evaluation electronics 62 of FIG. 9, if not explicitly described otherwise. The exemplary embodiment of FIG. 9 is based on the concept of varying the position of spot 22 in relation to the present position of soot particles 12. The spot movement has to be so much faster than the movement of soot particles 12 with exhaust gas 32 that soot particles flying through spot 22 are illuminated and heated multiple times while they are located in spot 22, so that a periodic LII signal results. Lock-in or other amplification methods may be applied to such a signal, as was explained with reference to FIG. 8. One difference from FIG. 8 results in that the activation signal of shaker module 68 is supplied to lock-in amplifier 66, since it is synchronous with the movement of spot 22 and thus the variation of the intensity of the LII signal.

The variation of the position of spot 22 is generated by a movement of laser module 18 driven by shaker module 68. Shaker module 68 includes, for example, a piezoelectric actuator which is actuated by control module 64. Alternatively to a piezoelectric actuator, the use of an electromagnetic actuator or an actuator operating using magnetostriction is also conceivable. Depending on the configuration of the actuator, the oscillation movement may take place in parallel or transversely to the laser beam direction, which is represented in FIG. 9 by the indication of possible oscillation directions 70. The oscillation direction may also be perpendicular to the plane of the drawing.

Figure 10:
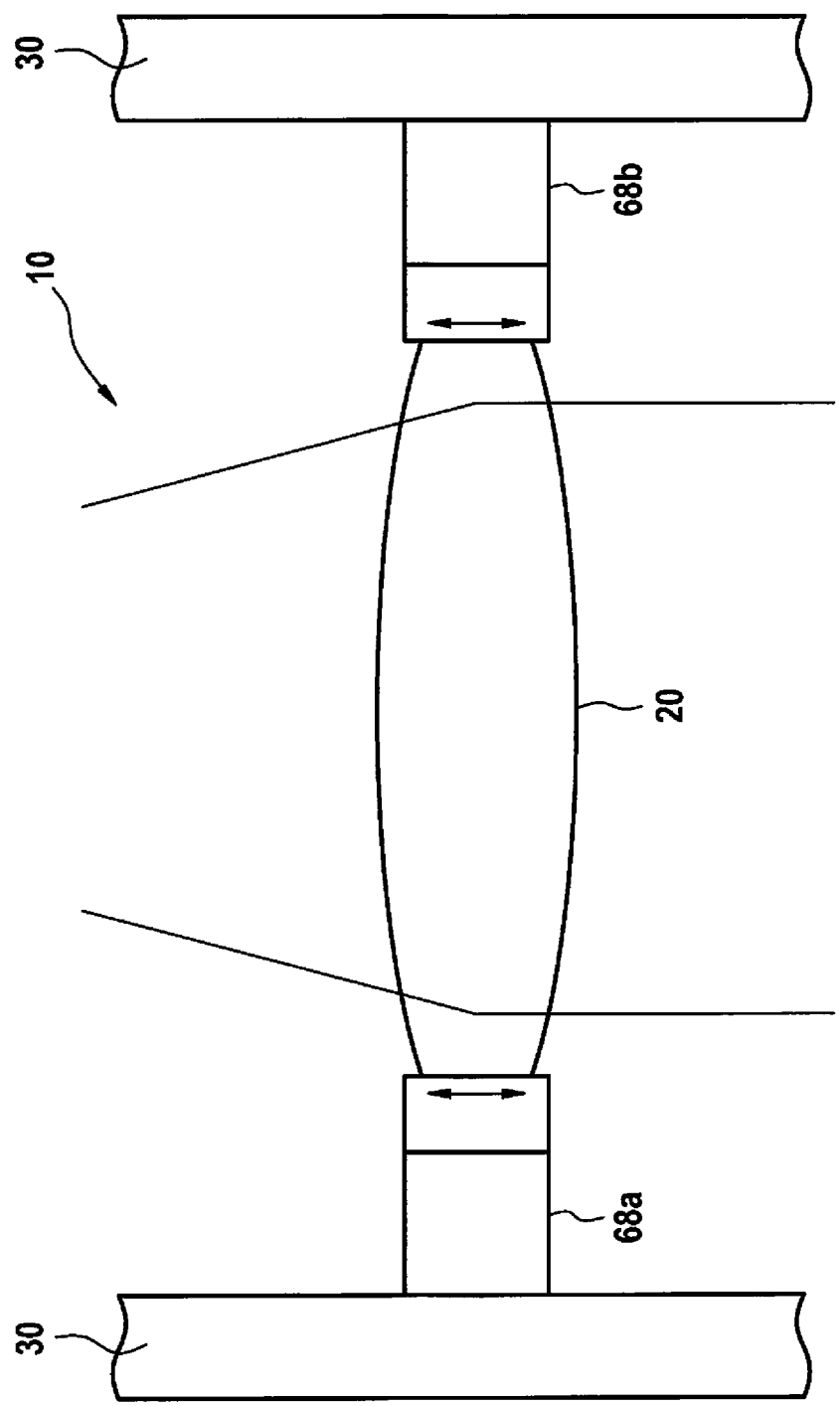
FIG. 10 schematically shows details of a fourth exemplary embodiment of a particle sensor according to the present invention.

FIG. 10 shows details of a configuration of a soot particle sensor 16 alternative to FIG. 9, which is configured to cause the spatial location of spot 22 to oscillate. Soot particle sensor 16 of FIG. 10 includes two shaker modules 68a, 68b, whose movable part is mechanically coupled in each case to optical element 20, so that an oscillation movement of the shaker module is transmitted to optical element 20. The mechanical coupling may be a rigid connection. The two shaker modules 68a, 68b may be activated synchronously and with the same phase and amplitude, so that optical element 20 is moved back and forth in the propagation direction of laser light 10, which effectuates a corresponding movement of the beam waist.

Further suitable methods are also conceivable for the variation of the position of spot 22. The movement itself is also not restricted to a specific shape or direction. It is only important that soot particles 12 are each illuminated multiple times more and less intensively because of the oscillating movement of spot 22, so that a variation/oscillation of their LII light intensity results.

One main advantage of the variation of the position of spot 22 over a variation of the intensity of laser light 10 is that the intensity of the laser light backscattered by the optical components does not vary upon the variation of the position of spot 22. In exemplary embodiments which operate using the variation of the position of spot 22, filter 42 of the exemplary embodiment shown in FIG. 4 may thus be omitted, which enables cost savings.

FIG. 11 shows spot 22 in a beam waist 73 of laser light 10 for two different combinations of flow direction 72 of the gas carrying soot particles 12 and propagation direction 74 of laser light 10. The two directions 72, 74 are parallel to one another in part a) of FIG. 11 (left). This corresponds to the arrangement of the soot particle sensors presented up to this point. In part b) of FIG. 11 (right), the two directions 72, 74 are transverse in relation to one another, which corresponds to an alternative imaginable structure of the soot particle sensor. In both cases, it is possible to vary the position of spot 22 both in parallel and perpendicularly in relation to the particular movement direction of the soot particles. At least four possible combinations of oscillation direction 70 of spot 22 and the propagation direction of laser light 10 thus result.

Beam waist 73 is the area of the beam path of laser light 10 in soot particle sensor 16 in which laser light 10 is focused most strongly. The size of beam waist 73 is restricted downward due to optical laws and therefore may not be infinitely small. Spot 22 is the spatial area in which the light intensity and thus the energy density and the temperature of the soot particles are sufficiently high to generate the laser-induced incandescence or to ignite chemical reactions.

Figure 12:
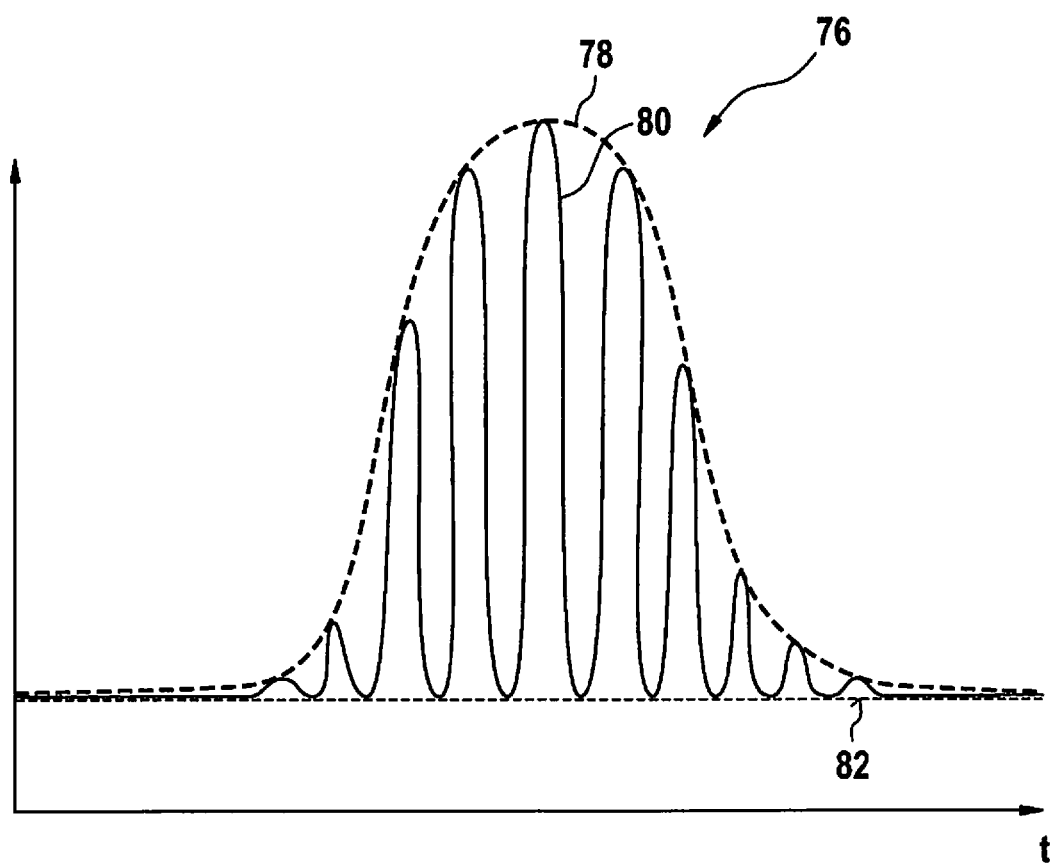
FIG. 12 schematically shows a qualitative representation of a LII signal, which results in the case of a spatially oscillating spot.

FIG. 12 shows a schematic exemplary view of LII signal 76 of detector 26, which is induced by a soot particle 12 which flies through spatially oscillating spot 22. Signal 76 qualitatively corresponds to signal 54 shown in FIG. 7. Hüll curve 78 corresponds to the LII signal for the case that spot 22 is not moved. However, due to the actually existing variation of the position of spot 22, soot particle 12 is illuminated and heated again and again, so that a periodic signal 80 results, in which the rapid spatial oscillation of soot particle 12 is imaged. Lock-in amplification methods or general signal correlation methods may be applied to such a signal 80 to improve the signal-to-noise ratio and in particular to eliminate the parasitic signal background 82.

Figure 13:
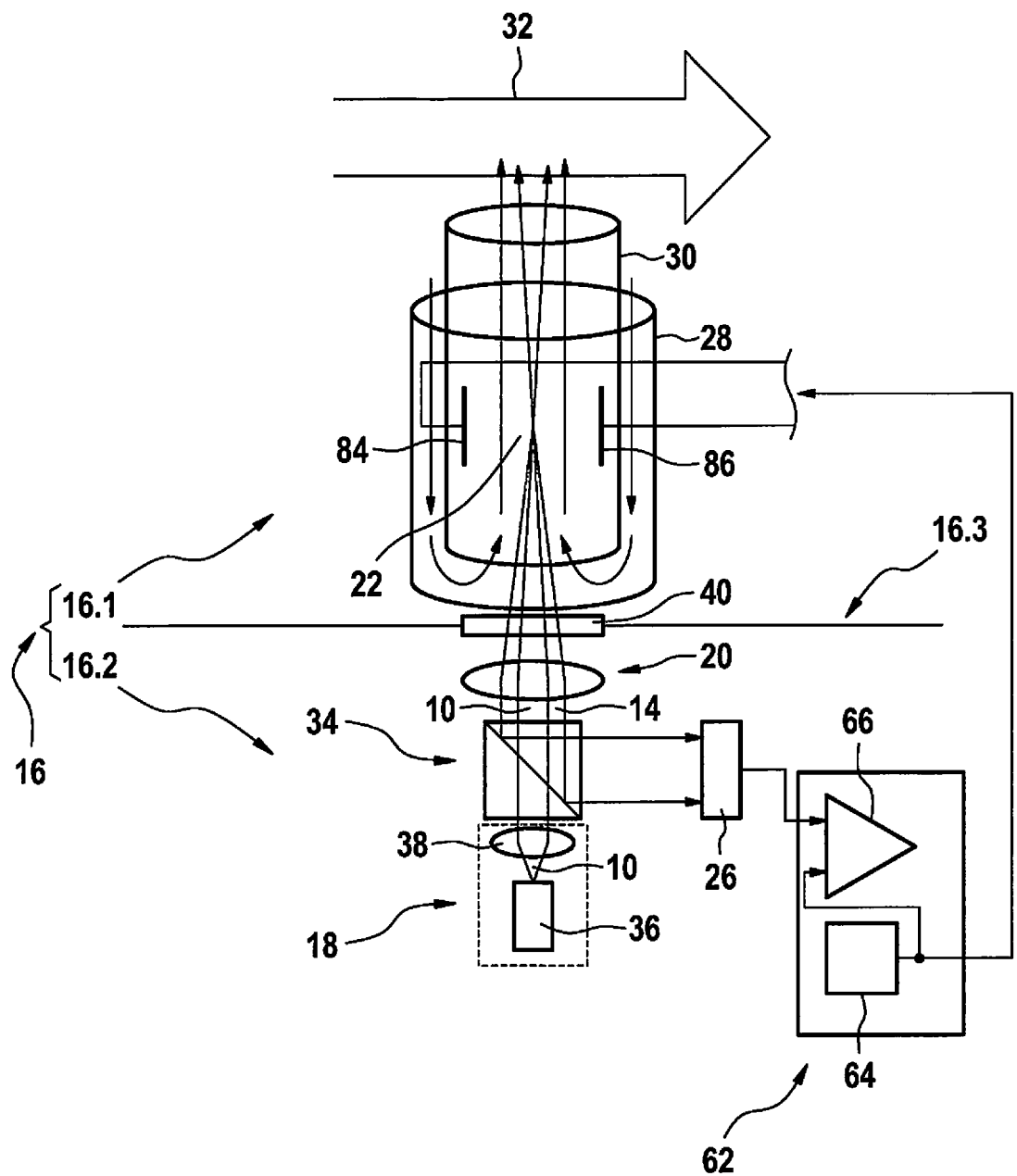
FIG. 13 schematically shows a fourth exemplary embodiment of a soot particle sensor according to the present invention.

FIG. 13 shows another configuration of a soot particle sensor 16 according to the present invention. Soot particle sensor 16 according to FIG. 13 is also based on soot particle sensors 16 explained with reference to FIGS. 3 and 4 and additionally includes a pair of electrodes 84, 86, which are situated in soot particle sensor 16 on different sides of spot 22. Electrodes 84, 86 may be situated in the interior of inner protective tube 30. These electrodes 84, 86 are used to generate an electrical alternating field, which permeates spot 22. The AC voltage generating the field is applied by control module 64 to electrodes 84, 86. This results in an externally induced spatial oscillation of the soot particle flow which periodically modulates the measuring signal. This enables the use of correlation techniques (for example, lock-in or pseudorandom sequence) in the detection, which improves the signal-to-noise ratio by multiple orders of magnitude. In the illustrated exemplary embodiment, the AC voltage supplied to electrodes 84, 86 is supplied in parallel to an input of a lock-in amplifier 66. At least a part of the soot particles carries an electric charge.

FIG. 14 shows beam waist 73 of laser light 10 defining spot 22 together with a soot particle 12 which is presently flying through spot 22. As in all other figures, spot 22 is also the spatial region here in which the intensity is sufficiently high that soot particles 12 flying through are heated sufficiently strongly that they are excited to emit radiation, in particular to emit temperature radiation. With no applied electrical field, soot particle 12 passes through spot 22 in a uniform movement at the flow speed of the exhaust gas in flow direction 72 of the exhaust gas. This situation is shown in part a) of FIG. 14. An oscillation is applied to the trajectory of (electrically charged) soot particle 12 by the application of the electrical alternating field, which is aligned transversely in relation to flow direction 72 of the exhaust gas, and it leaves spot 22 and enters spot 22 again after a reversal of the field direction. Under the presumption of a sufficiently high frequency of the electrical alternating field, soot particle 12 is periodically heated and the LII signal originating therefrom is periodically modulated.

FIG. 15 shows a schematic view of LII signal 90 of a soot particle, which moves on an oscillating trajectory through laser spot 22, in arbitrary units over time t. Hüll curve 92 corresponds to the LII signal for the case that an electrical alternating field is not applied. The soot particle is illuminated and heated again and again by the periodic entering and leaving of the laser spot as a result of the applied alternating field, so that a periodic LII signal 94 results. Correlation methods may be applied to such a signal, as already described above for other configurations, to improve the signal-to-noise ratio (SNR) and to eliminate the parasitic background 96.

An estimation of the frequencies required for this purpose may be carried out by the following computation: The relevant lengths for this process are given by axial extension $2z_0$ and lateral extension $2w_0$ of beam waist 73 (laser focus). The dimensions of spot 22 largely correspond to these dimensions. The lateral extension is given by the intensity drop to $1/e^2$, as is typical in the Gaussian geometric optics. Distance $z_0$ is also referred to as the Rayleigh length and is defined via beam waist $w_0$ and wavelength $\lambda$ of the laser of laser module 18:

$$z_0 = \frac{\pi w_0^2}{\lambda}$$

The minimum required frequency for the applied electrical alternating field is given by the condition that a soot particle 12, on its path through spot 22, leaves spot 22 and enters spot 22 again once. Maximum period duration $\Delta t_{max}$ and thus minimal frequency $$\frac{1}{f_{min}} = \frac{2z_0}{v_{exh}}$$

may thus be computed in consideration of exhaust gas flow speed $v_{exh}$. For a beam waist of $2w_0=10$ µm, a wavelength of 1 µm, and an exhaust gas speed of approximately 1 m/s, for example, a minimum frequency of approximately 6 kHz results. A typical operating frequency is to be selected as higher by a factor of at least 10 to enable multiple passes of soot particle 12 through spot 22. In this way, the LII signal is periodically modulated at frequency f and a detection using correlation techniques (lock-in, pseudorandom sequence) is enabled. This permits a strong suppression of background signals 96, as are caused, for example, by a light backscattered by optical elements in the beam path. The general signal-to-noise ratio is also improved by the use of correlation techniques.

The use of these correlation methods is not possible at high frequencies (in the range of kHz to MHz) using the Q-switched, pulsed ns lasers used in the related art due to their low repetition rates. This is possible without problems using the present invention described here.

Electrodes 84, 86 used for applying the alternating field may themselves be provided with a heating element to heat them at regular intervals, so that the accumulating soot is burned off.

Figure 16:
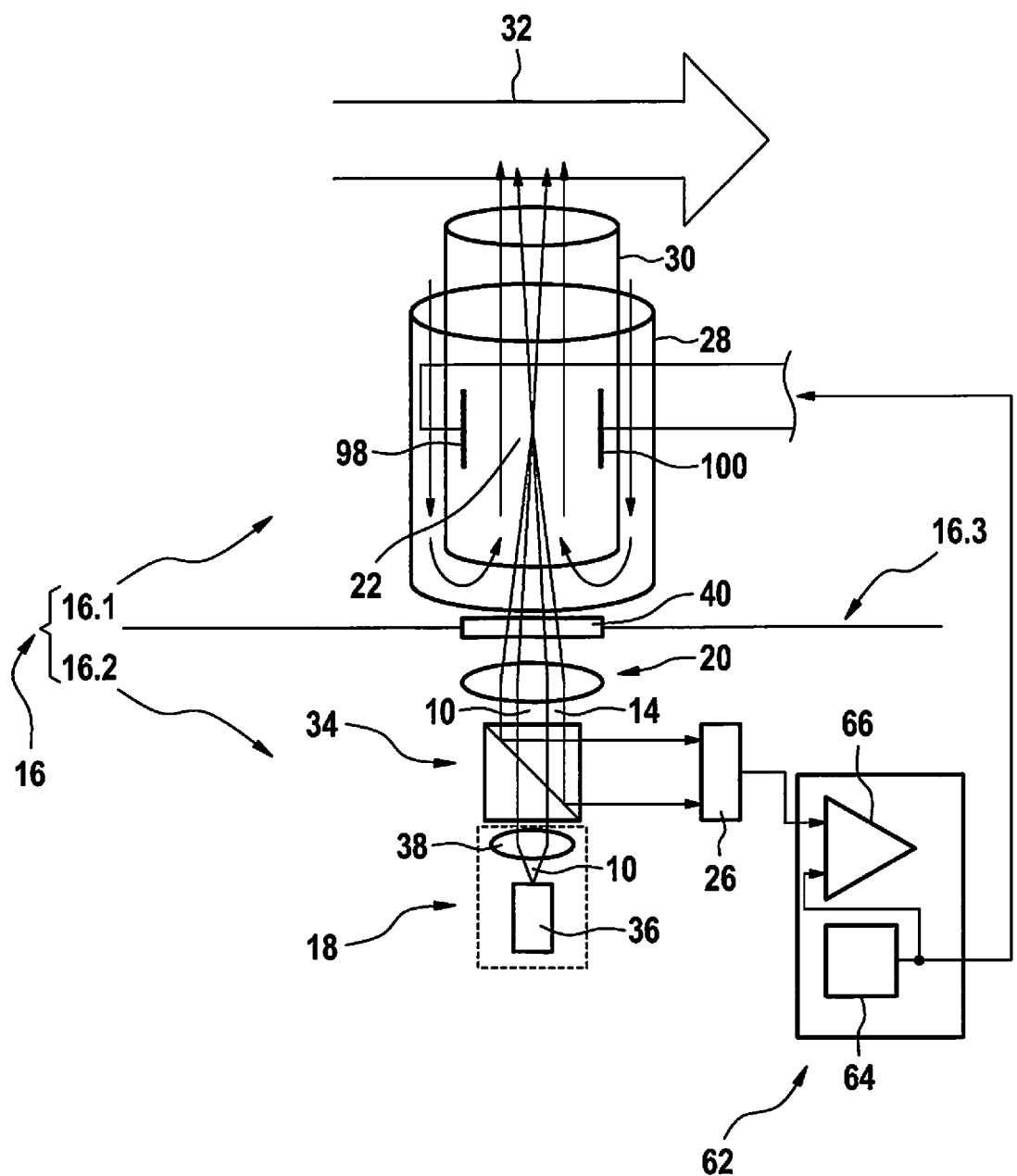
FIG. 16 schematically shows a fifth exemplary embodiment of a soot particle sensor according to the present invention.

FIG. 16 shows an exemplary embodiment of a soot particle sensor 16, which includes soundwave exciters 98, 100 and is based on soot particle sensor 16 shown in FIG. 3. The pair of soundwave exciters 98, 100 is situated in the interior of protective tube 30. Soundwave exciters 98, 100 oscillate transversely in relation to the flow direction of soot particles 12. Soundwave exciters 98, 100 are, for example, electrical transducers which are actuated, for example, on a piezoelectric or magnetostriction basis or electromagnetically like loudspeakers and generate a standing ultrasound wave.

Figure 17:
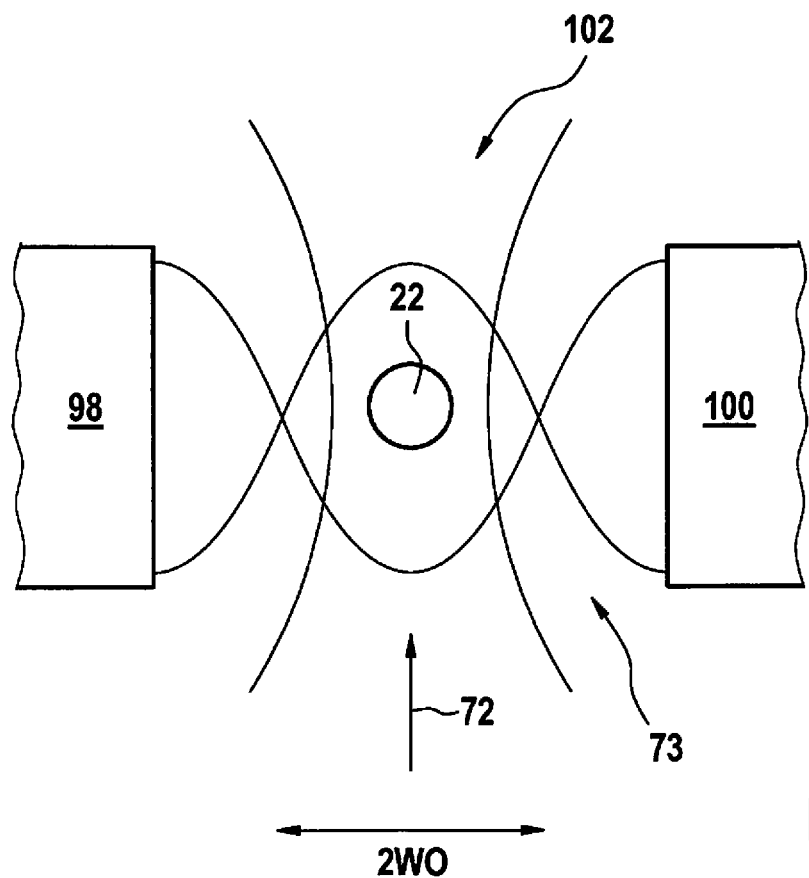
FIG. 17 schematically shows an example of a standing ultrasound wave, which results between soundwave exciters of the soot particle sensor from FIG. 16.

FIG. 17 shows an example of such a standing ultrasound wave 102, which results between soundwave exciters 98, 100. The exciter frequency of soundwave exciters 98, 100 may be set in such a way that spot 22 is located in a speed bulge of a standing ultrasound wave 102 resulting between soundwave exciters 98, 100. Spot 22 is a spatial area defined by beam waist $2w_0$ and Rayleigh length $2z_0$, in which the intensity of laser light 10 is sufficiently high to "ignite" LII (applies to all exemplary embodiments). In this way, soot particles 12 are displaced out of spot 22 periodically and transversely in relation to their original flow direction 72 upon passing spot 22 of the speed bulge and drawn back in again, so that a modulation of the particle excitation results, which is imaged in a modulation of the LII signal. The LII signal typically decays on a timescale in the range of 0 to 100 ns after an excitation.

An estimation of the modulation frequencies required for this purpose is carried out completely similarly to the estimation carried out above in detail according to FIG. 13 for soot particle sensor 16. With the speed of sound in air of approximately 340 m/s and an operating frequency of f=60 Hz, a wavelength of the ultrasound wave of approximately 5 mm results, which is well implementable in a protective tube. When passing spot 22 of the speed bulge, the soot particles are periodically displaced out of the focus, so that a modulation of the particle excitation results. In this way, the LII signal is periodically modulated at frequency f and a detection using correlation techniques (lock-in, pseudo-random sequence) is enabled. This permits a strong suppression of background signals, as are caused, for example, by backscattered light from optical elements in the beam path. In addition, the location of the speed bulge of standing ultrasound wave 102 may be displaced in a controlled manner by variation of the excitation frequency of soundwave exciters 98, 100, to thus achieve the desired modulation of the detection signal. The technical advantage of this special approach is a still further reduced sampling rate in the signal evaluation, which results in a simpler evaluation circuit (costs) and therefore results in a lower power consumption.

A modulation of the phases of the oscillations of the two soundwave exciters 98, 100 in relation to one another (phase modulation) is also conceivable. Soundwave exciters 98, 100 used for generating the ultrasound wave may themselves be provided with at least one heating element to heat them at regular intervals, so that the accumulating soot is burned off.

A time curve of the LII signal results as is shown in FIG. 15 and as is typical for a soot particle 12, which moves on a trajectory extending in an oscillating manner through spot 22. Hüll curve 92 corresponds to the LII signal for the case that an acoustic alternating field is not applied. Due to the periodic entering and leaving of the laser spot as a result of the applied alternating field, the soot particle is illuminated and heated again and again, so that a periodic LII signal 94 results. Correlation methods may be applied to such a signal to improve the signal-to-noise ratio (SNR), as has already been explained with reference to FIG. 12, which is thus comparable.

Figure 18:
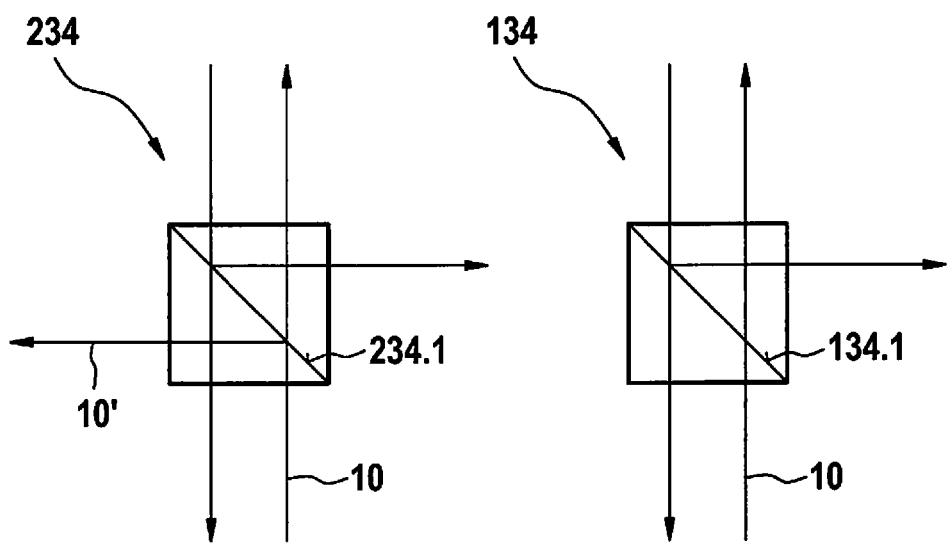
FIG. 18 schematically shows a comparison of a non-polarizing beam splitter to a polarizing beam splitter.

FIG. 18 shows a comparison of a non-polarizing beam splitter 234 to a polarizing beam splitter 134. The left half of FIG. 22 relates to non-polarizing beam splitter 234, while the right half relates to a polarizing beam splitter 134.

Polarizing beam splitter 134 is distinguished in that it transmits or reflects light at different strengths depending on polarization. For a predetermined polarization direction of the incident light, an almost complete transmission results, and for the polarization of the incident light perpendicular thereto, an almost complete reflection results.

Since laser light 10 is generally already polarized, it may pass polarizing beam splitter 134 in the arrangement selected suitably for the polarization direction of polarizing beam splitter 134 in one direction (through to spot 22) practically without loss, while beam splitter surface 234.1 of non-polarizing beam splitter 234 already reflects up to 50% of the power transported with laser light 10 out of the useful beam path. This loss is represented in the left part of FIG. 18 by arrow 10' pointing to the left. In beam splitter 134 shown in the right part of FIG. 18, this loss component 10' does not occur. In other words: By way of the correct selection of the laser polarization and alignment of the laser, the transmitted power at this point may be maximized (to almost 100%), while in the case of typical non-polarizing beam splitters 234, a power loss of approximately 50% during the transmission through the beam splitter has to be accepted. Laser light 10 passes through beam splitter surface 134.1 of polarizing beam splitter 134 without being attenuated.

The transmitted light, as described with reference to FIGS. 3 and 4, is focused by second lens 20 through protective window 40 to spot 22 in protective tube 30. At equal power of the laser, therefore twice as much light power is available in spot 22 for heating particles upon the use of polarizing beam splitter 134.

This configuration has the advantage that the maximum intensity in spot 22 is elevated with otherwise unchanged soot particle sensor 16, which heats soot particles 12 to be measured to higher temperatures and thus increases the radiant power originating from heated soot particles 12 of radiation 14 emitted in the form of temperature radiation. As a consequence, an improved signal-to-noise ratio results.

Radiation 14, which originates from soot particles 12 located in spot 22 and is emitted in the direction toward the lens, may be detected via the same lens 20 and conducted via polarizing beam splitter 134 to detector 26. Since radiation 14 originating from the heated soot particles does not have a preferential polarization, approximately half of radiation 14 detected by lens 20 is oriented onto detector 26. Since soot particles 12 only emit unpolarized radiation 14, only a residual loss remains in detection beam path, which would occur in any case. Polarizing beam splitter 134 may be used as beam splitter 34 in all exemplary embodiments according to the present invention, i.e., in particular in all particle sensors described in this application. Similarly thereto, a non-polarizing beam splitter 234 may be used as beam splitter 34 in all exemplary embodiments according to the present invention, i.e., in particular in all particle sensors described in this application.

The use of polarizing beam splitter 134 therefore has the advantage over configurations operating using non-polarizing beam splitters 234 that a substantially higher power density and temperature T may be achieved in spot 22 due to the elevated optical pump power and thus the power spontaneously emitted therein rises strongly (Kirchhoff's law of radiation $P \sim T^4$). Soot particle sensor 16 may also include an optical filter 42 here, which is situated in the beam path between (polarizing) beam splitter 134 and detector 26 and includes the above-described properties. Shielding of detector 26 from laser light 10 is achieved using this filter 42, which also improves the signal-to-noise ratio.

What is claimed is:

1. A soot particle sensor, comprising:
   a laser module, including a laser and a detector to detect temperature radiation; and
   an optical element, which is situated in a beam path of the laser of the laser module, wherein the optical element is configured to bundle laser light originating from the laser module in a spot, and wherein the detector is situated in the soot particle sensor so that it detects radiation originating from the spot,
   a beam splitter including a polarizing beam splitter, which is situated in the beam path of the parallel laser light so that it orients at least a part of the laser light incident from the laser module onto the optical element and orients radiation incident from the spot at least partially onto the detector.

2. The soot particle sensor of claim 1, wherein the laser module is configured to generate parallel laser light, and wherein the optical element is configured to bundle parallel laser light originating from the laser module in the spot.

3. The soot particle sensor of claim 1, wherein the laser of the laser module is a continuous wave (CW) laser.

4. The soot particle sensor of claim 1, wherein the laser is a semiconductor laser element.

5. The soot particle sensor of claim 1, wherein the detector includes at least one photodiode.

6. The soot particle sensor of claim 1, further comprising:
   a shaker module, which includes an element movable in an oscillating manner, which is mechanically rigidly connected to the laser module, so that an oscillation of the movable part of the shaker module is transmitted to the laser module.

7. The soot particle sensor of claim 6, wherein the shaker module includes a piezoelectric actuator including the movable element or an electromagnetic actuator including the movable element or an actuator operating using magnetostriction including the movable element.

8. The soot particle sensor of claim 1, wherein the soot particle sensor includes a pair of electrodes, which are situated in the soot particle sensor on different sides of the spot.

9. The soot particle sensor of claim 1, further comprising:
   a pair of soundwave exciters, which are situated in the interior of the inner protective tube.

10. The soot particle sensor of claim 1, wherein the laser includes a laser diode.

11. A soot particle sensor, comprising:
    a laser module, including a laser and a detector to detect temperature radiation; and
    an optical element, which is situated in a beam path of the laser of the laser module, wherein the optical element is configured to bundle laser light originating from the laser module in a spot, and wherein the detector is situated in the soot particle sensor so that it detects radiation originating from the spot,
    a beam splitter including a polarizing beam splitter, which is situated in the beam path of the parallel laser light so that it orients at least a part of the laser light incident from the laser module onto the optical element and orients radiation incident from the spot at least partially onto the detector,
    wherein the polarizing beam splitter is aligned so that it is maximally permeable to the incident laser light having a predetermined polarization direction.

12. A soot particle sensor, comprising:
    a laser module, including a laser and a detector to detect temperature radiation;
    an optical element, which is situated in a beam path of the laser of the laser module, wherein the optical element is configured to bundle laser light originating from the laser module in a spot, and wherein the detector is situated in the soot particle sensor so that it detects radiation originating from the spot,
    a beam splitter, which is situated in the beam path of the parallel laser light so that it orients at least a part of the laser light incident from the laser module onto the optical element and orients radiation incident from the spot at least partially onto the detector, and
    an optical filter, which is situated in the beam path between the beam splitter and the detector and is less permeable to the laser light than to temperature radiation originating from the spot.

13. The soot particle sensor of claim 12, wherein the laser is configured to emit laser light at wavelengths below 500 nm, and the optical filter is configured to attenuate or block light having wavelengths below 500 nm.

14. The soot particle sensor of claim 12, wherein the laser is configured to emit laser light at wavelengths below 405 nm, 450 nm, or 465 nm, and the optical filter is configured to attenuate or block light having wavelengths below 500 nm.

15. A soot particle sensor, comprising:
    a laser module, including a laser and a detector to detect temperature radiation;
    an optical element, which is situated in a beam path of the laser of the laser module, wherein the optical element is configured to bundle laser light originating from the laser module in a spot, and wherein the detector is situated in the soot particle sensor so that it detects radiation originating from the spot, and
    a first part, which is configured to be subjected to a measuring gas, and a second part, which is not to be subjected to the measuring gas and which contains the optical components of the soot particle sensor, wherein the two parts are separated by a partition wall impermeable to the measuring gas.

16. The soot particle sensor of claim 15, wherein a window, which is permeable to laser light and to radiation originating from the spot, is installed in the partition wall in the beam path of the laser light.

17. The soot particle sensor of claim 15, further comprising:
an outer protective tube and an inner protective tube, each of which is cylindrically shaped or prismatically shaped, wherein the protective tubes are situated coaxially, wherein the axes of the cylindrically shaped or prismatically shaped tubes are aligned parallel to the incidence direction of the laser light and the spot is located in the interior of the inner protective tube, wherein the outer protective tube protrudes beyond the inner protective tube at its end facing toward the laser, and wherein the inner protective tube protrudes beyond the outer protective tube at the opposing end.

18. A soot particle sensor, comprising:
a laser module, including a laser and a detector to detect temperature radiation;

an optical element, which is situated in a beam path of the laser of the laser module, wherein the optical element is configured to bundle laser light originating from the laser module in a spot, and wherein the detector is situated in the soot particle sensor so that it detects radiation originating from the spot, and a pair of soundwave exciters, which are situated in the interior of the inner protective tube, wherein the soundwave exciters include electrical transducers, which operate based on piezoelectricity or magnetostriction or are electromagnetically actuated and which are configured to generate a standing ultrasound wave.

* * * * *